United States Patent
Hsiang

(10) Patent No.: US 11,051,009 B2
(45) Date of Patent: Jun. 29, 2021

(54) VIDEO PROCESSING METHODS AND APPARATUSES FOR PROCESSING VIDEO DATA CODED IN LARGE SIZE CODING UNITS

(71) Applicant: MEDIATEK INC., Hsinchu (TW)

(72) Inventor: Shih-Ta Hsiang, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 0 days.

(21) Appl. No.: 16/962,538

(22) PCT Filed: Dec. 6, 2018

(86) PCT No.: PCT/CN2018/119531
§ 371 (c)(1),
(2) Date: Jul. 16, 2020

(87) PCT Pub. No.: WO2019/141012
PCT Pub. Date: Jul. 25, 2019

(65) Prior Publication Data
US 2021/0037237 A1    Feb. 4, 2021

Related U.S. Application Data

(60) Provisional application No. 62/620,005, filed on Jan. 22, 2018, provisional application No. 62/618,664, (Continued)

(51) Int. Cl.
*H04N 19/103* (2014.01)
*H04N 19/119* (2014.01)
(Continued)

(52) U.S. Cl.
CPC ......... *H04N 19/103* (2014.11); *H04N 19/119* (2014.11); *H04N 19/159* (2014.11);
(Continued)

(58) Field of Classification Search
CPC .......................... H04N 19/162; H04N 19/119
See application file for complete search history.

(56) References Cited

U.S. PATENT DOCUMENTS 8,849,049 B2   9/2014   Kato et al.
9,756,359 B2   9/2017   Zhao et al.
(Continued)

FOREIGN PATENT DOCUMENTS

CN   102595130 A   7/2012
CN   104137545 A   11/2014
(Continued)

OTHER PUBLICATIONS

International Search Report and Written Opinion dated Feb. 27, 2019, issued in application No. PCT/CN2018/119531.

*Primary Examiner* — Jerry T Jean Baptiste
(74) *Attorney, Agent, or Firm* — McClure, Qualey & Rodack, LLP

(57) ABSTRACT

Video data processing methods and apparatuses in a video encoding or decoding system for processing a slice partitioned into Coding Units (CUs). The video encoding or decoding system receives input data of a current CU and checks a size of the current CU. The residual of the current CU is set to zero or the current CU is coded in Skip mode if the size of the current CU is greater than a maximum size threshold value. A CU with zero residual implies coefficient level values in one or more corresponding transform blocks (Continued)

are all zero, complicated transform processing for large size blocks is therefore avoided.

20 Claims, 9 Drawing Sheets

Related U.S. Application Data filed on Jan. 18, 2018, provisional application No. 62/618,662, filed on Jan. 18, 2018, provisional application No. 62/618,660, filed on Jan. 18, 2018.

(51) Int. Cl.
*H04N 19/159* (2014.01)
*H04N 19/174* (2014.01)
*H04N 19/186* (2014.01)
*H04N 19/70* (2014.01)

(52) U.S. Cl.
CPC ......... *H04N 19/174* (2014.11); *H04N 19/186* (2014.11); *H04N 19/70* (2014.11)

(56) References Cited

U.S. PATENT DOCUMENTS

| 10,542,294 | B2 | 1/2020 | Huang et al. |
| 2012/0106633 | A1* | 5/2012 | Kim ..................... H04N 19/122 375/240.12 |
| 2013/0016783 | A1* | 1/2013 | Kim ..................... H04N 19/119 375/240.13 |
| 2013/0156328 | A1* | 6/2013 | Wang ..................... H04N 19/51 382/203 |
| 2015/0043639 | A1 | 2/2015 | Lee et al. |
| 2015/0156504 | A1 | 6/2015 | Cheon et al. |
| 2015/0334405 | A1 | 11/2015 | Rosewarne et al. |
| 2016/0156907 | A1* | 6/2016 | Liang ..................... H04N 19/70 375/240.12 |
| 2016/0309156 | A1* | 10/2016 | Park ..................... H04N 19/119 |
| 2019/0364279 | A1* | 11/2019 | Yasugi ................ H04N 19/119 |

FOREIGN PATENT DOCUMENTS

| CN | 104322067 A | 1/2015 |
| CN | 105814896 A | 7/2016 |
| TW | 201739260 A | 11/2017 |

* cited by examiner

MxM  M/2xM  MxM/2  M/2xM/2

M/4xM (L)  M/4xM (R)  MxM/4 (U)  MxM/4 (D)

VIDEO PROCESSING METHODS AND APPARATUSES FOR PROCESSING VIDEO DATA CODED IN LARGE SIZE CODING UNITS

CROSS REFERENCE TO RELATED PATENT APPLICATION

The present invention claims priority to U.S. Provisional Patent Application Ser. No. 62/618,660, filed on Jan. 18, 2018, entitled "Methods and apparatus for coding units of video data", U.S. Provisional Patent Application Ser. No. 62/618,662, filed on Jan. 18, 2018, entitled "Methods and apparatus for partitioning coding units of video data", U.S. Provisional Patent Application Ser. No. 62/618,664, filed on Jan. 18, 2018, entitled "Methods and apparatus for low-complexity coding units of video data", and U.S. Provisional Patent Application Ser. No. 62/620,005, filed on Jan. 22, 2018, entitled "Methods and apparatus for coding units of video data". The U.S. Provisional Patent Applications are hereby incorporated by reference in their entireties.

TECHNICAL FIELD

The present invention relates to encode or decode video data using large size coding units. In particular, the present invention relates to methods and apparatuses for processing coding units with a size greater than a specified maximum transform size and each coding unit contains a single transform unit.

BACKGROUND

High-Efficiency Video Coding (HEVC), also known as H.265, is a video compression standard developed by the Joint Collaborative Team on Video Coding (JCT-VC) group of video coding experts from ITU-T Study Group. The HEVC standard greatly improves the coding efficiency of its precedent standard, H.264. Both standards compress video data by comparing different areas of a video picture in order to find redundancies within the video picture and within neighboring pictures, and these areas are replaced with short information for describing the original pixels. One of the coding tools in HEVC has the ability to expand the size of these areas into bigger or smaller blocks, called Coding Tree Unit (CTU), whilst H.264 only allows a fixed size for these areas. The coding structure of HEVC splits each video picture into multiple non-overlapped square CTUs. A coded picture is represented by one or a collection of slices and each slice is composed of an integer number of CTUs. Each individual CTU in a slice is processed in a raster scanning order. Blocks in a Bi-predictive (B) slice are coded using intra prediction or inter prediction, where sample values in each inter coded block is predicted using at most two motion vectors and reference indices. Blocks in a Predictive (P) slice are also coded using intra prediction or inter prediction, but sample values in each inter coded block is predicted using at most one motion vector and reference index. Blocks in an Intra (I) slice are coded using intra prediction only.

In the HEVC main profile, the maximum and the minimum sizes of a CTU are specified by syntax elements signaled in the Sequence Parameter Set (SPS). Each CTU is further recursively partitioned into one or more non-overlapped Coding Units (CUs) using QuadTree (QT) splitting structure in order to adapt various local motion and texture characteristics. The size of a CTU is selected from 64×64, 32×32, and 16×16 pixel samples. At each depth of the QT splitting structure, an N×N block is either a single leaf CU or split into four smaller blocks with equal size N/2×N/2. The CTU with the size M×M pixel samples is the root node of a quadtree coding tree, and the four M/2×M/2 blocks are the child quadtree nodes split from the root node. Each of the four M/2×M/2 blocks may become parent node for another split into four child nodes with further reduced size by half in each spatial dimension. If a coding tree node is not further split, it is the leaf CU. The leaf CU size is restricted to be larger than or equal to a minimum allowed CU size, and the minimum and maximum CU sizes are specified in the SPS. An example of a recursive quadtree splitting structure is illustrated in FIG. 1, where the solid lines indicate CU boundaries in the CTU 100.

Once the CTUs are partitioned into leaf CUs, each leaf CU is subject to further split into one or more Prediction Units (PUs) according to a PU splitting type for prediction. FIG. 2 shows eight different PU splitting types defined in the HEVC standard. Each CU is split into one, two, or four PUs according to one of the eight PU splitting types shown in FIG. 2. Unlike the recursive quadtree splitting for CUs, each leaf CU may only be split once to form PUs. The PU works as a basic representative block for sharing prediction information as the same prediction process is applied to all pixels in the PU. The prediction information is conveyed to the decoder on a PU basis.

After obtaining residual data generated by the prediction process based on the PU splitting type, the residual data belonging to a leaf CU is partitioned into one or more Transform Units (TUs) according to a Residual QuadTree (RQT) splitting structure for transforming the residual data into transform coefficients for compact data representation. The dashed lines in FIG. 1 indicate TU boundaries in the CTU 100. The TU is a basic representative block for applying transform and quantization on the residual data or transform coefficients. For each TU, a transform matrix having the same size as the TU is applied to the residual data to generate transform coefficients, and these transform coefficients are quantized and conveyed to the decoder on a TU basis. Each TU of a video picture in 4:2:0 color format is composed of a Transform Block (TB) of luminance (luma) samples of size 8×8, 16×16, or 32×32 or four TBs of luma samples of size 4×4, and two corresponding TBs of chrominance (chroma) samples. The minimum and maximum TB sizes are specified in the SPS.

The terms Coding Tree Block (CTB), Coding Block (CB), Prediction Block (PB), and Transform Block (TB) are defined to specify Two-Dimensional (2-D) sample array of one color component associated with the CTU, CU, PU, and TU respectively. For example, a CTU consists of one luma CTB, two chroma CTBs, and its associated syntax elements. A similar relationship is valid for CU, PU, and TU. In the HEVC system, the same quadtree splitting structure is generally applied to both luma and chroma components unless a minimum size for the chroma block is reached.

Binary-tree (BT) splitting structure is an alternative structure to the quadtree splitting structure which recursively divides a block into two smaller blocks. FIG. 3 illustrates six exemplary splitting types for the binary-tree splitting structure, which includes symmetrical splitting types 31 and 32 and asymmetrical splitting types 33, 34, 35, and 36. A simplest binary-tree splitting structure only allows symmetrical horizontal splitting type 32 and symmetrical vertical splitting type 31. For a given block with size M×N, a first flag is signaled to indicate whether this block is partitioned into two smaller blocks, followed by a second flag indicating the splitting type if the first flag indicates splitting. This M×N block is split into two blocks of size M×N/2 if the splitting type is symmetrical horizontal splitting, and this M×N block is split into two blocks of size M/2×N if the splitting type is symmetrical vertical splitting. The splitting process can be iterated until the block size, width, or height of a splitting block reaches a minimum block size, width, or height defined in a high level syntax set such as SPS. Both the minimum block width and height need to be indicated since the binary-tree splitting structure is capable of splitting a block either horizontally or vertically. Horizontal splitting is implicitly not allowed if a block height is smaller than the minimum block height, and similarly, vertical splitting is implicitly not allowed if a block width is smaller than the minimum block width.

FIGS. 4A and 4B illustrate an example of block partitioning according to a binary-tree splitting structure and its corresponding coding tree structure. In FIG. 4B, one flag at each splitting node (i.e., non-leaf) of the binary-tree coding tree is used to indicate the splitting type, flag value equals to 0 indicates horizontal symmetrical splitting while flag value equals to 1 indicates vertical symmetrical splitting.

Joint Video Expert Team (JVET) of ITU-T SG16 WP3 and ISO/IEC JTC1/SC29/WG11 are currently in the process of developing the next-generation video coding standard called Versatile Video Coding (VVC). Some promising new coding tools have been adopted into Joint Exploration Model (JEM) and VVC Working Draft (WD) 1 for further investigation. A new splitting structure called QuadTree plus Binary Tree (QTBT) structure is adopted in JEM to balance the trade off between coding efficiency and the coding complexity of the quadtree splitting structure and the binary-tree splitting structure. An exemplary QTBT structure is shown in FIG. 5A, where a CTU is firstly partitioned by a quadtree splitting structure then a binary-tree splitting structure. The CUs can be recursively partitioned by quadtree splitting until the current CU size reaches a minimum quadtree leaf node size. Each leaf quadtree block may be further partitioned by a binary-tree structure if the leaf quadtree block size is not larger than a maximum binary-tree root node size. The binary-tree splitting may be recursively applied until the current CU size, width, or height reaches a minimum binary-tree leaf node size, width, or height or the binary-tree depth reaches a maximum binary-tree depth. Only horizontal symmetrical splitting and vertical symmetrical splitting are the two allowed binary-tree splitting types in JEM. The resulting leaf CUs from QTBT splitting in JEM are the basic representative block for both prediction and transform processing without any further partitioning, which means each CU contains exactly one PU for the prediction processing and each CU contains exactly one TU for the transform processing. As opposed to HEVC, there is no additional information for specifying the partitioning structure from a CU to PUs and from a CU to TUs.

FIG. 5A illustrates an example of block partitioning structure according to the QTBT splitting structure and FIG. 5B illustrates a corresponding coding tree diagram for the QTBT splitting structure shown in FIG. 5A. The solid lines in FIGS. 5A and 5B indicate quadtree splitting while the dashed lines indicate binary-tree splitting. Similar to FIG. 4B, in each splitting node (i.e., non-leaf node) of the binary-tree structure, one flag indicates which splitting type is used, 0 represents horizontal symmetrical splitting and 1 represents vertical symmetrical splitting. In the QTBT splitting structure, the minimum quadtree leaf node size, the maximum binary-tree root node size, the minimum binary-tree leaf node width and height, and the maximum binary-tree depth and height are indicated in the high level syntax such as in the SPS. In P and B slices, each CTU is composed of CTBs of the three color components. In I slices, CTBs of the three color components are separately represented by two CTUs, one CTU for the luma CTB and another CTU for the two chroma CTBs. The partitioning structures of the two CTUs are controlled independently and a coding tree representation indicating partitioning from a CTU into CUs is signaled for each CTU. Each luma CU contains one CB from the luma component whereas each chroma CU contains two CBs from chroma cb and chroma cr components respectively. For CTUs coded in I slices, the coding tree representation for each chroma CTU may be different from the coding tree representation for a corresponding luma CTU. For CTUs coded in P and B slice, the same coding tree representation is applied to both chroma CTBs and luma CTB.

Multi-Type-Tree (MTT) splitting structure adopted in VVC WD1 extends the concept of the two-level tree structure in the QTBT splitting structure by allowing both binary-tree splitting and triple-tree splitting in the second level of the MTT splitting structure. The two levels of trees in MTT are called Region Tree (RT) and Prediction Tree (PT) respectively. The first level RT is always QT splitting, while the second level PT is either BT splitting or center-side Triple-Tree (TT) splitting. For example, a CTU is firstly partitioned by RT, which is QT splitting; and each RT leaf node may be further divided by PT, which is either BT or TT splitting. A block partitioned by PT may be further split with PT until a maximum PT depth is reached. A PT leaf node is the leaf CU for prediction and transform and will not be further split. FIG. 6 illustrates five splitting types used in MTT splitting structure, where the splitting types include QT splitting type 61, BT splitting types 62 and 63, and TT splitting types 64 and 65. The vertical center-side TT splitting type 64 and horizontal center-side TT splitting type 65 divide a block into three smaller blocks, all having reduced sizes in one spatial dimension while keeping the same size in the other spatial dimension.

A coded block flag (cbf) in the HEVC standard is used to indicate if there is any non-zero coefficient in a transform block, and when cbf is equal to 1, the associated transform block contains at least one non-zero coefficient, otherwise, the associated transform block is not further coded and all the coefficients in the transform block are inferred to be zero. In HEVC, syntax elements cbf luma, cbf cb, and cbf cr are signaled to derive the cbf of a transform block from luma, cb, and cr components respectively. A syntax element rqt_root_cbf (residual quadtree root cbf) is utilized in an inter-coded CU to compactly indicate if all coded block flags of transform blocks in the inter-coded CU are zero. For example, at least one cbf of a transform block in the CU is 1 when rqt_root_cbf is equal to 1, whereas all the coded block flags of transform blocks in the CU are not coded and inferred to be 0 when rqt_root_cbf is equal to 0. In VVC WD1, a similar syntax element cu_cbf (coding unit coded block flag) is present in the video bitstream for a CU to indicate whether all coded block flags associated with the CU are zero.

Another syntax element cu_skip_flag defined in the HEVC standard is signaled for each CU in the inter-predicted slices to indicate if a current CU is coded in Skip mode (MODE_SKIP). When cu_skip_flag is 1, representing a current CU is coded in Skip mode, no more syntax elements except a motion vector merging candidate index (merge_idx) is coded for the current CU. Inter prediction parameters of the current CU coded in Skip mode are inferred from a selected neighboring inter-predicted partition and associated residual of the current CU is inferred to be equal to 0.

SUMMARY

Methods and apparatuses of video processing in a video coding system comprises receiving input video data associated with a current Coding Unit (CU) in a current slice, determining whether a size of the current CU is greater than a maximum size threshold value, setting residual of the current CU to zero when the size of the current CU is greater than the maximum size threshold value, and encoding the current CU in the current slice to form a video bitstream or decoding the current CU in the current slice from the video bitstream. The current slice is partitioned into multiple non-overlapped CUs by a recursive splitting structure such as quadtree, QTBT, MTT, or other splitting structure, and each CU contains only one Transform Unit (TU). The current CU is served as a basic representative block for both prediction and transform processing so it is not further partitioned into smaller blocks for prediction and transform processing.

The size of the current CU and the maximum size threshold value are measured in one-dimensional or in two-dimensional, for example, the size of the current CU is a width or height when the size is measured in one-dimensional, and the size of the current CU is an area when the size is measured in two-dimensional. In some embodiments, a current TU in the current CU is consisting of a luma Transform Block (TB) and two chroma TBs, and all coefficient level values inside the luma and chroma TBs are set to zero when the current CU is greater than the maximum size threshold value.

An embodiment of the video encoder skips signaling information related to associated residual of the current CU when the size of the current CU is greater than the maximum size threshold value, and a corresponding video decoder infers the associated residual of the current CU to be equal to zero when the size of the current CU is greater than the maximum size threshold value.

The maximum size threshold value may be explicitly signaled in a high-level syntax set of the video bitstream or implicitly derived. In some examples, the maximum size threshold value is set or derived from a specified maximum transform size, where the maximum transform size is either a maximum transform unit size or a maximum transform block size.

In a specific embodiment, the video encoder or decoder sets residual of the current CU to zero by selecting Skip mode to encode or decode the current CU when the size of the current CU is greater than the maximum size threshold value. In this embodiment, the current CU is inferred to be encoded by Skip mode when it is greater than the maximum size threshold value, the video encoder may skip signaling a skip flag (cu_skip_flag) as the video decoder infers the skip flag as one when the size of the current CU is greater than the maximum size threshold value.

Exemplary video encoders or decoders set residual of the current CU to zero by setting a coded block flag (cbf) of one or more TBs in the current CU to zero when the size of the current CU is greater than the maximum size threshold value. When the cbf of a TB is equal to zero, all coefficient level values in the TB are inferred as zero. An encoder may skip signaling the cbf of the TB in the current CU so a corresponding decoder infers the cbf to be equal to zero when the size of the current CU is greater than the maximum size threshold value. Similarly, an encoder may skip signaling one or a combination of a residual quadtree root cbf, a CU prediction mode flag, and a merge flag, and a corresponding decoder infers the residual quadtree root cbf to be equal to zero, the CU prediction mode flag as inter prediction mode, and the merge flag as not merge when the size of the current CU is greater than the maximum size threshold value.

A variation of the video processing method not only compares the size of the current CU with the maximum size threshold value, the size of the current CU is also compared with a minimum size threshold value. Residual of the current CU is set to zero when the size of the current CU is smaller than the minimum size threshold value. The minimum size threshold value is either explicitly signaled in a high-level syntax set of the video bitstream or implicitly derived. An example of the minimum size threshold value is set or derived from a specified minimum transform size.

In some embodiments, the current slice is a Bi-predictive (B) slice or a Predictive (P) slice, so only CUs in B and P slices are allowed to be coded with a size greater than the maximum size threshold value. CUs in Intra (I) slices are restricted to have a size less than or equal to the maximum size threshold value. In some other embodiments, only inter coded CUs are allowed to have a size greater than the maximum size threshold value, whereas all intra coded CUs are restricted to have a size less than or equal to the maximum size threshold value. The current CU is coded either in Skip mode or in AMVP mode with zero residual when the size of the current CU is greater than the maximum size threshold value.

An additional syntax element is signaled in the video bitstream indicating whether large size CUs are allowed according to an embodiment, and if the syntax element indicates large size CUs are not allowed, the video encoder or decoder forces to split the current CU into smaller CUs when the size of the current CU is greater than the maximum size threshold value.

Aspects of the disclosure further provide an apparatus for processing video in a video coding system which comprises one or more electronic circuits configured to receive input video data associated with a current CU, determine whether a size of the current CU is greater than a maximum size threshold value, set residual of the current CU to zero when the size of the current CU is greater than the maximum size threshold value, and encode or decode the current CU by prediction and transform processing without further splitting.

Aspects of the disclosure further provide a non-transitory computer readable medium storing program instructions for causing a processing circuit of an apparatus to perform video coding process to encode or decode a current CU by setting residual of the current CU to zero when the size of the current CU is greater than a maximum size threshold value. Other aspects and features of the invention will become apparent to those with ordinary skill in the art upon review of the following descriptions of specific embodiments.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF PREFERRED EMBODIMENTS

Figure 1:
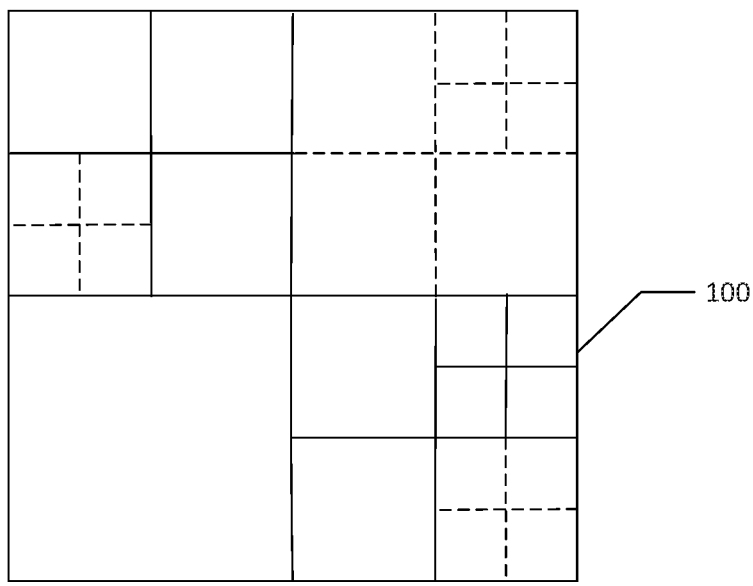
FIG. 1 illustrates an exemplary coding tree for splitting a Coding Tree Unit (CTU) into Coding Units (CUs) and splitting each CU into one or more Transform Units (TUs) according to the quadtree splitting structure.
Figure 2:
FIG. 2 illustrates eight different PU splitting types for partitioning a CU into one or more PUs defined in the HEVC standard.
Figure 2:
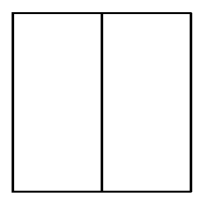
Figure 2:
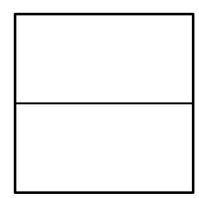
Figure 2:
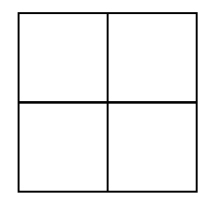
Figure 2:
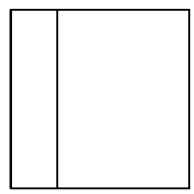
Figure 2:
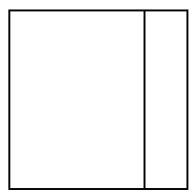
Figure 2:
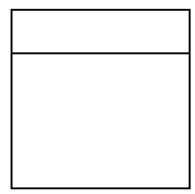
Figure 2:
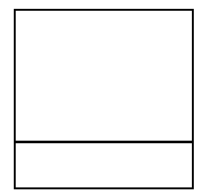
Figure 3:
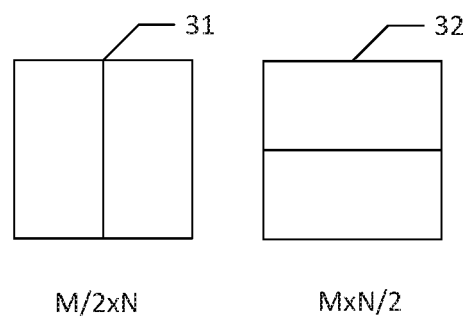
FIG. 3 illustrates six exemplary splitting types of a binary-tree splitting structure.
Figure 3:
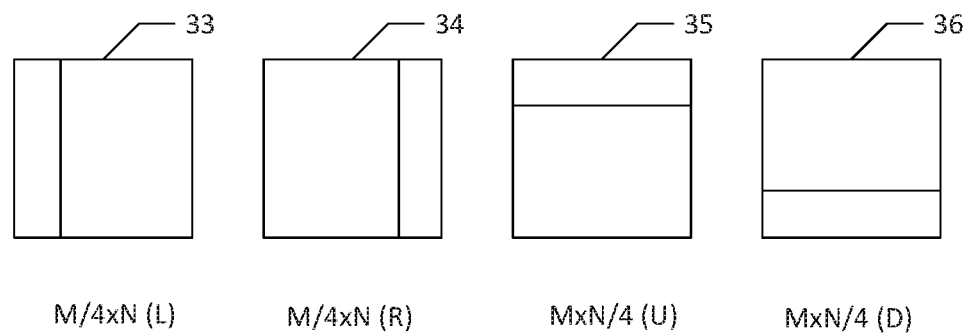
Figure 4A:
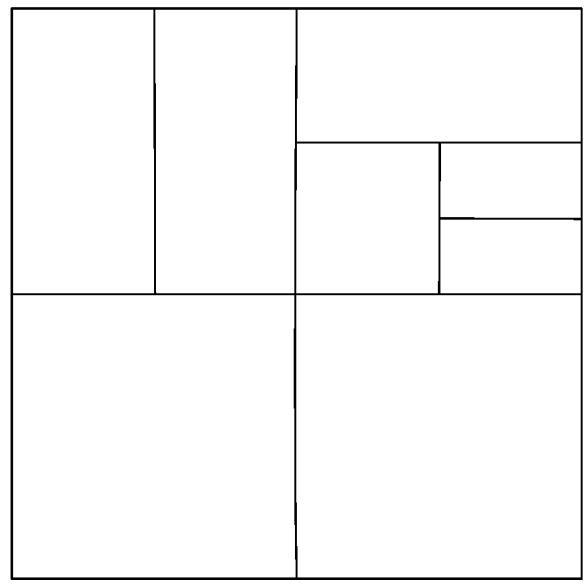
FIG. 4A illustrates an exemplary block partitioning structure according to a binary-tree splitting structure.
Figure 4B:
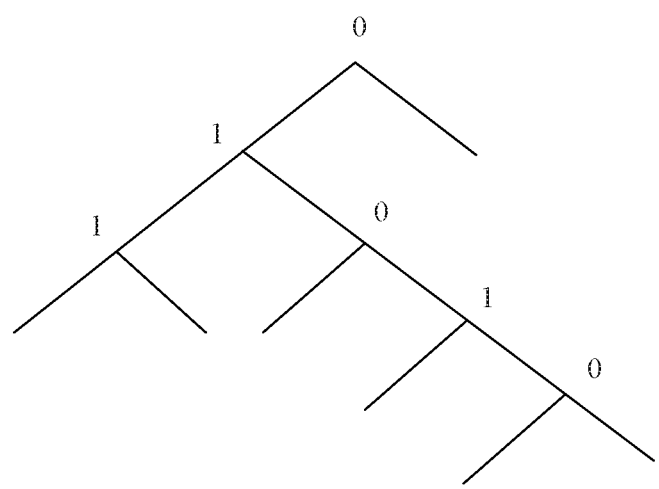
FIG. 4B illustrates a coding tree structure corresponding to the binary-tree splitting structure shown in FIG. 4A.
Figure 5A:
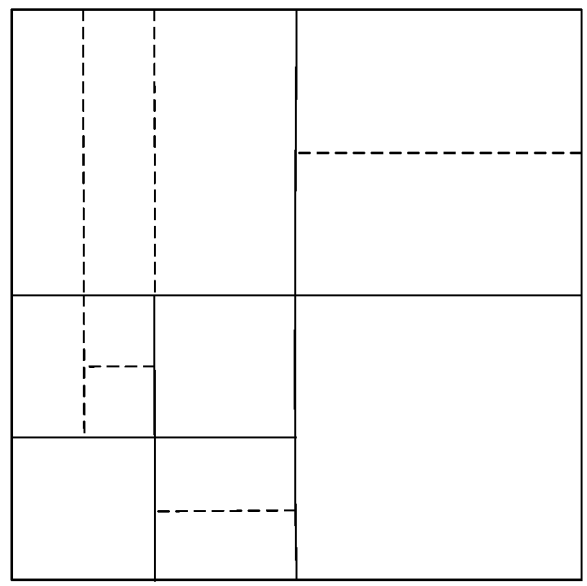
FIG. 5A illustrates an exemplary block partitioning structure according to a QuadTree plus Binary Tree (QTBT) splitting structure.
Figure 5B:
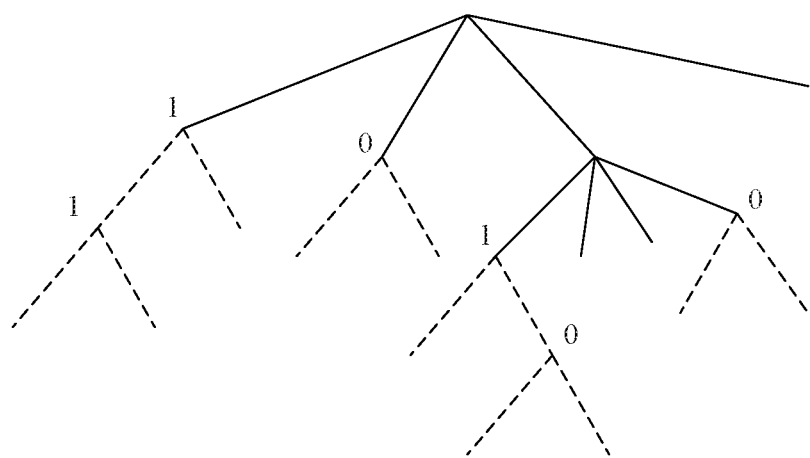
FIG. 5B illustrates a coding tree structure corresponding to the QTBT splitting structure of FIG. 5A.
Figure 6:
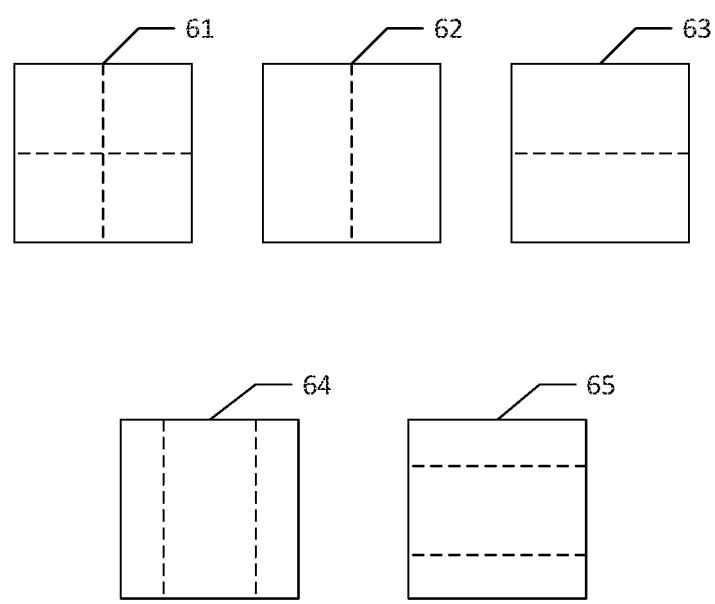
FIG. 6 illustrates five splitting types used in an exemplary Multi-Type Tree (MTT) splitting structure.

It will be readily understood that the components of the present invention, as generally described and illustrated in the figures herein, may be arranged and designed in a wide variety of different configurations. The following more detailed description of the embodiments of the systems and methods of the present invention, as represented in the figures, is not intended to limit the scope of the invention, as claimed, but is merely representative of selected embodiments of the invention.

Reference throughout this specification to "an embodiment", "some embodiments", or similar language means that a particular feature, structure, or characteristic described in connection with the embodiments may be included in at least one embodiment of the present invention. Thus, appearances of the phrases "in an embodiment" or "in some embodiments" in various places throughout this specification are not necessarily all referring to the same embodiment, these embodiments can be implemented individually or in conjunction with one or more other embodiments. Furthermore, the described features, structures, or characteristics may be combined in any suitable manner in one or more embodiments. One skilled in the relevant art will recognize, however, that the invention can be practiced without one or more of the specific details, or with other methods, components, etc. In other instances, well-known structures, or operations are not shown or described in detail to avoid obscuring aspects of the invention.

CUs in the next-generation video compression standard VVC WD1 are designed to be the basic representative block for both prediction and transform operations, thus each CU contains exactly one PU for prediction operation and exactly one TU for transform operation. The CTU size supported by the HEVC standard is up to 64×64 luma samples and the transform block size supported by the HEVC standard is up to 32×32 samples. The next-generation video compression standard is expecting to allow the use of larger CTU size and transform block size for high-resolution video applications, for example, the CTU size in JEM is up to 256×256 luma samples and the maximum TU size is 128×128 luma samples, and VVC WD 1 supports CTU size up to 128×128 luma samples and the TU size up to 64×64 luma samples. A maximum transform size is specified to restrict the TU size as the hardware implementation complexity and computational costs associated with the transform processing tend to expand significantly with the increase in transform block size. Theoretically, the maximum CU size is the same as the specified CTU size as a CTU may contain only one CU. However, when one CU contains only one TU, a CU with the maximum CU size (e.g. 128×128 luma samples as defined in VVC WD1) is forced to be split into smaller CUs as it exceeds the maximum TU size (e.g. 64×64 luma samples as defined in VVC WD1).

In HEVC, the CTU size and the maximum TU size, both in units of luma samples, are specified in the SPS, and residual of a current CU is forced to be split into four TUs if the current CU size is greater than the specified maximum TU size. An associated syntax split_transform_flag for indicating whether to split a TU is not coded and inferred to be equal to one when the block size of the TU is greater than the maximum TU size. In the next-generation video compression standard under development, since a CU contains only one TU, a large size CU with a width or height larger than the width or height of the maximum TU size is forced to be split into smaller CUs until each CU is smaller than or equal to the maximum TU size. This forced-to-split solution for handling large size CUs reduces the maximum CU size according to the maximum TU size. An alternative solution to handle these large size CUs is to allow exceptions to the "one CU containing one TU rule" that is each of the large size CUs contains multiple TUs instead of one TU, and the size of each TU is smaller than or equal to the maximum TU size. Both solutions may lead to a loss in compression efficiency for the resulting bitstream because the forced-to-split solution prohibits from using large size CUs, and the other solution violates the one CU containing one TU rule which implies more bits are used to signal multiple TUs in each large size CU.

Residual is Inferred as Zero for Large Size CUs Various embodiments of a video encoder or a video decoder in this disclosure are capable of coding video data using large size CUs and at the same time obeying the rule of one CU containing one TU, while maintaining comparative implementation complexity and computational costs associated with the transform processing. A video encoder or decoder implementing an embodiment of a zero residual method may encode or decode video data using large size CUs without supporting additional processing modules associated with the increased transform size. The large size CUs are defined as CUs with a size greater than a maximum size threshold value. An example of the maximum size threshold value is set as the specified maximum transform size, such as 32×32 luma samples in HEVC standard or 64×64 luma samples in VVC WD1. Since a CU is the basic representative unit for both prediction and transform processing, an encoder or decoder capable of processing large size CUs denotes having the capability to process transform blocks with a size greater than the specified maximum transform size. According to the zero residual method, when a size of a current CU is greater than a maximum size threshold value, the video encoder or decoder sets residual of the current CU to zero.

The maximum size threshold value may be explicitly signaled in a high-level syntax set such as SPS, PPS, and slice header, or it may be implicitly derived. In some examples, the maximum size threshold is set or derived from a maximum transform size, such as setting the maximum size threshold value to be less than or equal to the maximum transform size to ensure transform blocks greater than the maximum transform size contain all zero coefficients. Setting residual of a current CU to zero implies each TB in the current CU contains only zero coefficients. Quantization and transform processing for TBs with only zero coefficients may be skipped. In this way, the video encoder or decoder may use large size CUs for representing video data without further supporting additional processing modules associated with the increased transform size.

A benefit of the zero residual method is to provide the flexibility for encoders to choose whether to encode video data in a large size CU with zero residual or split the large size CU into normal size CUs according to rate-distortion optimization or complexity performance. The normal size CUs are CUs with a size smaller than or equal to the maximum size threshold value, and corresponding TBs in these normal size CUs are allowed to have non-zero coefficients. It is in contrast to the conventional method which always recursively force to split the large size CUs until the sizes of all the associated TBs are smaller than or equal to the maximum transform size. The maximum transform size in this disclosure may refer to a maximum transform unit (TU) size or a maximum transform block (TB) size. In this disclosure, sizes may be measured in two-dimensional or in one-dimensional, when the sizes are measured in two-dimensional, an area of a CU is compared with a maximum transform area; and when the sizes are measured in one-dimensional, a width and a height of a CU are compared with a maximum transform size in order to determine whether this CU is a large size CU. For example, if one or both of a width and height of a current CU is greater than the maximum transform size, the current CU is a large size CU and the residual of the current CU is set to zero.

In the zero residual method, residual of a current CU is set to zero if the current CU is a large size CU, and the current CU may be coded in either inter prediction mode or intra prediction mode. A video encoder may select Advance Motion Vector Prediction (AMVP) mode or Skip mode to encode a large size CU when the CU prediction mode is inter prediction. When Skip mode is selected for the large size CU, the video encoder only signals a motion vector merging candidate index to indicate a neighboring inter-predicted partition, and the video decoder derives motion information from the neighboring inter-predicted partition. When AMVP mode is selected, the video encoder signals a Motion Vector Difference (MVD) together with a Motion Vector Predictor (MVP) index indicating a neighboring inter-predicted partition, and the video decoder derives the Motion Vector (MV) of the large size CU by adding the MVD with the MVP of the neighboring inter-predicted partition. In one embodiment, the zero residual method is only applied to CUs coded using inter prediction, all CUs coded using intra prediction are restricted to have a size less than or equal to the maximum size threshold value. In another embodiment, the zero residual method is only applied to CUs in B slices and P slices, all CUs in I slices are restricted to have a size less than or equal to the maximum size threshold value.

In some embodiments for achieving further bit rate reduction, a video encoder skips signaling information related to the associated residual of a current CU when a width, height, or area of the current CU is greater than a maximum transform size. A corresponding video decoder infers the residual of the current CU to be equal to zero when the width, height, or area of the current CU is greater than the maximum transform size.

In one specific example, after adopting the disclosed zero residual method, a video encoder supporting a CTU size of 256×256 samples and a maximum TU size of 128 samples in both width and height may encode CUs of size greater than 128×128 without further implementing addition transform processing modules for transform block of 256 samples in width and height. A corresponding video decoder after adopting the disclosed zero residual method may also decode CUs of size greater than 128×128 samples without implementing additional transform processing modules for transform block size of 256×256 samples.

Figure 7:
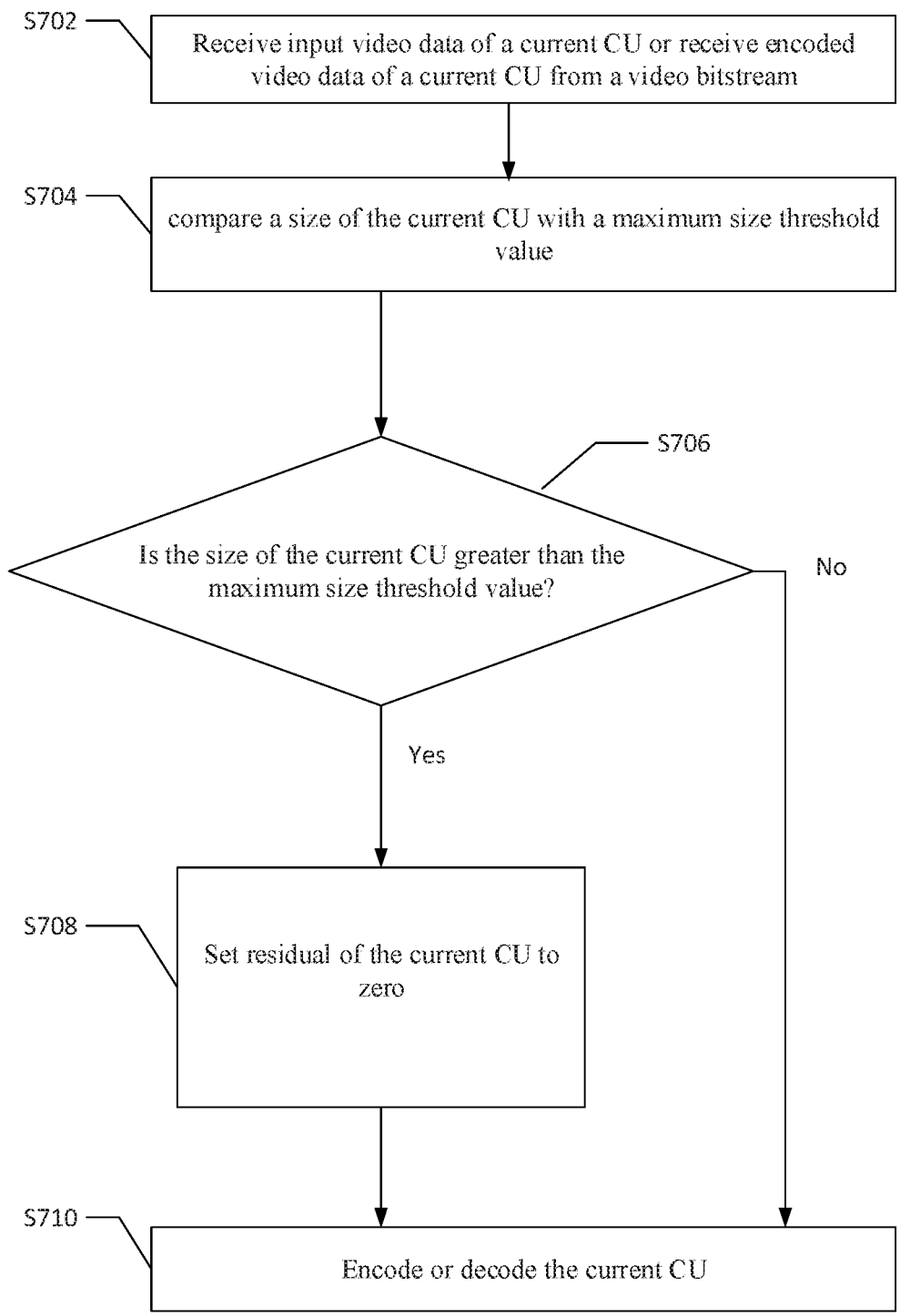
FIG. 7 is a flow chart illustrating an embodiment of the video processing method for encoding or decoding a current CU in a current slice.

FIG. 7 illustrates a flow chart demonstrating an embodiment of the zero residual method for processing video data in a video coding system. An exemplary encoder or decoder receives input video data associated with a current CU in a current slice or receives encoded video data associated with a current CU in a current slice from a video bitstream in step S702. The current CU is a leaf CU partitioned from the current slice, where the current slice is partitioned into multiple non-overlapped CUs according to a quadtree splitting structure, QTBT splitting structure, MTT splitting structure, or other recursive splitting structure. The encoder or decoder compares a size of the current CU with a maximum size threshold value in step S704 and determines whether the size of the current CU is greater than the maximum size threshold value in step S706. An example of the maximum size threshold value is set equal to the maximum transform size. If the size of the current CU is larger than the maximum size threshold, the encoder or decoder sets residual of the current CU to zero in step S708. The current CU may contain only one TB or it may contain two or more TBs, for example, one luma TB and two chroma TBs. In some embodiments, coefficient level values inside all TBs in the current CU are inferred as zero by setting each cbf associated with each of the TBs to zero or setting a residual quadtree root cbf to zero. The current CU is encoded or decoded by prediction and transform processing without further partitioning in step S710. In step S708, setting residual of the current CU to zero infers all coefficient level values in the current TU are zero and the complex computation in the transform processing is skipped.

Zero Residual Method for Small Size CUs In one embodiment, the zero residual method may be applied to extremely small size CUs, where residual of a current CU smaller than a minimum size threshold value is set to zero. For those extremely small size CUs, the prediction is more likely to have high accuracy, thus the residual is expected to be small. The video encoder or decoder forces the residual and associated coefficient level values of those small size CUs to be equal zero. By forcing residual of all extremely small size CUs to be zero, significant data bits and computation may be saved for signaling and processing these extremely small size CUs. The minimum size threshold value may also be explicitly signaled in a high-level syntax set such as SPS, PPS, and slice header or implicitly derived. The video encoder or decoder in this embodiment compares a size of a current CU to both a maximum size threshold value and a minimum size threshold value, and sets zero residual or zero coefficient level values if the current CU is either larger than the maximum size threshold value or smaller than the minimum size threshold value.

Coding Mode is Inferred as Skip Mode for Large Size CUs One specific embodiment of the zero residual method is a Skip mode method. In the Skip mode method, video encoders and decoders always select Skip mode for encoding and decoding large size CUs in B and P slices. The large size CUs in this disclosure may be defined as CUs with a size greater than a maximum size threshold value, or the large size CUs may be defined as CUs with a size within a specified size range. An exemplary specified size range includes any size larger than a maximum size threshold value or any size smaller than a minimum size threshold value. The specified size range may be derived from one or more syntax elements signaled in a high-level syntax set such as SPS, PPS, and slice header. The specified size range may relate to a number of total pixel samples, a width, or height of a CU. Skip mode is a useful inter prediction coding mode in HEVC which represents many CUs having low energy of residual signal after accurate motion-compensated prediction in B and P slices. Skip mode generally involves relatively lower bit costs as well as computational and implementation complexity comparing to other coding modes because residual and MVD of a current CU are not computed nor signaled in the bitstream when the current CU is coded in Skip mode. Embodiments of the video encoders and decoders effectively use Skip mode for improving coding performance in compression efficiency and reducing computational and hardware complexity in video coding systems.

In some embodiments of the Skip mode method, the video encoder or decoder skips signaling or skips encoding or decoding a skip flag, for example, the syntax element cu_skip_flag, for each of the large size CUs. This skip flag is inferred to be equal to one for a CU when the size of the CU is greater than a maximum size threshold value or within a specified size range. The Skip mode method restricts the large size CUs to be coded in Skip mode, resulting in lowering the computational complexity associated with CU mode decisions and speeding up the encoding time for processing these large size CUs. For each large size CU coded in Skip mode, only a motion vector merging candidate index is coded as the residual and MVD are always zero. Inter prediction parameters of a large size CU is simply inferred from a neighboring inter-predicted partition selected by the motion vector merging candidate index.

In one example, a video encoder skips signaling the syntax element cu_skip_flag for a current CU when a width, height, or area of the current CU is greater than the maximum size threshold value in B or P slice. At the decoder, the current CU is inferred to be coded in Skip mode when the width, height, or area of the current CU is greater than the maximum size threshold value in B or P slice. The maximum size threshold value in this example is the specified maximum transform size, such as 64×64 samples in VVC WD1. In another example, a video encoder or decoder always selects Skip mode to code a current CU in a B or P slice when a width, height, or area of the current CU is greater than a maximum size threshold value or less than a minimum size threshold value. The video encoder or decoder may further skip signaling or skip encoding or decoding the syntax element cu_skip_flag for CUs with a size greater than the maximum size threshold value or less than the minimum size threshold value. In yet another example, only the minimum size threshold value is applied, so the encoders and decoders are forced to code CUs smaller than the minimum size threshold value in Skip mode.

According to the Skip mode method, the video encoder or decoder supports encoding or decoding CUs having a size greater than the maximum TU size when the maximum size threshold value is set to be less than or equal to the maximum TU size. Under such specified conditions, all CUs with sizes exceeding the maximum TU size are coded in Skip mode and coefficient level values of the associated transform blocks are all inferred as zero. The maximum and minimum size threshold values may be signaled in the high-level syntax set such as SPS, PPS, and slice header, or these threshold values may be derived from the specified maximum and minimum transform sizes for the current bitstream.

For example, theoretically the maximum CU size in JEM is equal to the CTU size, which is 256×256 luma samples, the real maximum CU size in JEM is reduced to 128×128 luma samples because each CU greater than the maximum TU size of 128×128 luma samples is split into CUs smaller than or equal to the maximum TU size. By implementing either the disclosed zero residual method or the disclosed Skip mode method, the modified video encoders and decoders may encode and decode large size CUs having widths or heights greater than 128 luma samples. The maximum CU size becomes as large as the specified CTU size, which is 256×256 luma samples in this example.

Additional Syntax Element for Defining Large Size CUs In an aspect of the present invention, a video encoder inserts one or more syntax elements in a HLS set in the video bitstream to signal information for deriving one or more threshold values, where the one or more threshold values are used to define large size CUs, small size CUs or both. The threshold values may include a maximum size threshold value, a minimum size threshold value, or both the maximum and minimum size threshold value. In the following example of the disclosed Skip mode method, the threshold value only includes a maximum size threshold value. A video encoder encodes a current CU in Skip mode and skips signaling the CU skip flag for the current CU when a width, height, or area of the current CU is greater than the threshold value. At the decoder end, the CU skip flag is inferred to be equal to one, indicating the current CU is coded in Skip mode, when the width, height, or area of the current CU is greater than the threshold value. In an example of the zero residual method, information for deriving a maximum total threshold value or minimum total threshold value are signaled in one or more syntax elements in a HLS set in the video bitstream, and the video encoder or decoder always treats the residual for a current TU as zero if the total number of pixels in a current CU is greater than the maximum size threshold value or less than the minimum size threshold value.

Different Approach for I slices or Intra-coded CUs In some embodiment, a video encoder or decoder only employs the zero residual method for CUs in B and P slices because the residual of CUs in B and P slices tends to have low magnitude after motion-compensated prediction. For video data coded in I slices, the video encoder or decoder always partitions the CUs or TUs containing any TB of size greater than the maximum transform size into smaller CUs or TUs.

In the following examples, the CTU size is 128×128, the maximum transform size is 64×64, the color format is 4:2:0, and luma samples and chroma samples are coded into separate CTUs where CU partitioning structures of the luma CTU and chroma CTU are controlled independently in I slices. In one example, the zero residual method is only applied to CUs in B and P slices, so both luma and chroma CTUs in the I slices are forced to split into four smaller CUs of size 64×64 because the CTU size is greater than the maximum transform size. In another example of applying the zero residual method to CUs in B and P slices, the video encoder or decoder only forces to split luma CTUs as only the associated luma TBs in the luma CTUs are greater than the specified maximum transform size. The chroma CTUs are not forced to split since the associated chroma transform block in the chroma CTU is equal to the maximum transform size, which is 64×64.

In another embodiment, a video encoder or decoder may further impose the constraint that the zero residual method is employed only for CUs coded using any inter-prediction mode in B and P slices. All large size CUs in I slices and all intra-coded large size CUs in B and P slices are forced to split if the corresponding TB size exceeds the maximum transform size, or in an alternative embodiment, these large size CUs are not forced to split into small CUs, but each large size CU contains multiple TUs and each TU has a size smaller than or equal to the maximum transform size.

Figure 8:
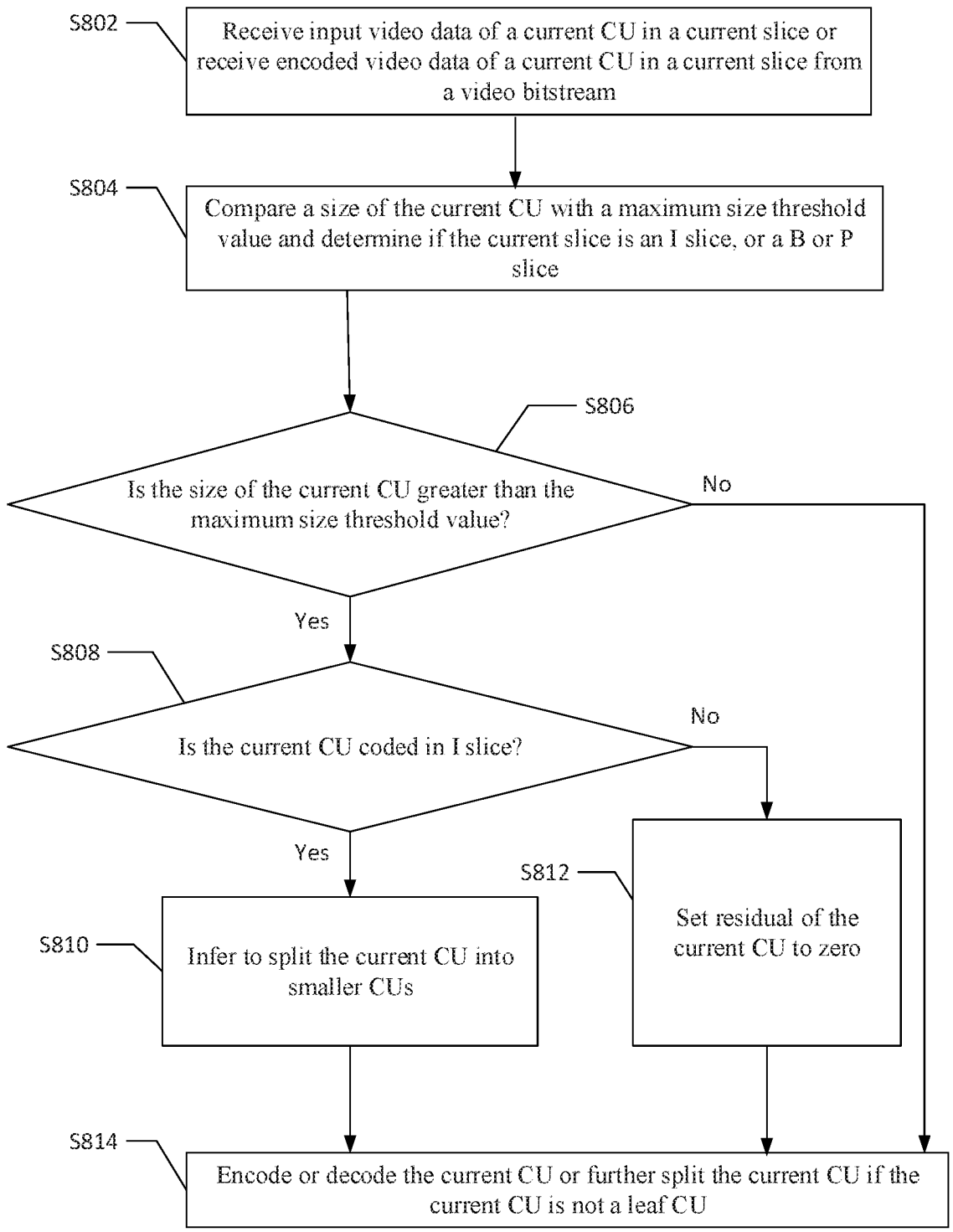
FIG. 8 is a flow chart illustrating another embodiment of the video processing method for encoding or decoding a current CU in a current slice.

FIG. 8 illustrates a flow chart demonstrating an embodiment of video processing method adopting the zero residual method only in B and P slices. An exemplary video encoder or decoder receives input video data of a current CU in a current slice or receives encoded video data of a current CU in a current slice from a video bitstream in step S802, and in step S804, the encoder or decoder compares a size of the current CU with a maximum size threshold value and determines whether the current slice is an I slice, or a B or P slice. Step S806 checks if the size of the current CU is greater than the maximum size threshold value, and if the size of the current CU is less than or equal to the maximum size threshold value, the encoder or decoder processes the current CU by a standard encoding or decoding procedure in step S814. When the current CU is a large size CU, which has a size greater than the maximum size threshold value, step S808 further checks if the current slice is an I slice. The encoder or decoder infers to split the current CU into CUs smaller than or equal to the maximum size threshold value if the current slice is an I slice in step S810. If the current slice is a B or P slice, the encoder or decoder sets residual of the current CU to zero in step S812. The current CU is then encoded or decoded by prediction and transform processing or the current CU is further split if the current CU is not a leaf CU in step S814. In another embodiment of a video processing method adopting the Skip mode method, step S812 in FIG. 8 may be replaced by inferring the coding mode of the current CU as Skip mode when the current CU is a large size CU and the current slice is B or P slice.

Encoder-Only Method Some embodiments of the disclosed zero residual method and the disclosed Skip mode method are implemented as an encoder-only method so corresponding decoders are not required to modify its parsing and decoding algorithm. An embodiment of the video encoder forces to set the prediction residual of a current CU equal to zero if a width, height, or area of the current CU is greater than a maximum size threshold value, and the video encoder encodes the current CU with zero residual. The video encoder may set the cbf associated with each TB in the current CU to zero in order to skip transform and quantization processing. The maximum size threshold value may be derived from the specified maximum transform size. Another embodiment of the video encoder implements the disclosed zero residual method by imposing a bitstream constraint so that the related syntax values are restricted to signal zero residual for a current CU when a width, height, or area of the current CU is greater than a maximum size threshold. The video encoder may also impose a bitstream constraint to restrict all coefficient level values in a transform block to be equal to zero when a width, height, or area of the transform block is greater than a maximum size threshold. The above disclosed embodiments are implemented in video encoders without modifications to the existing syntax so the decoding algorithm is not changed.

Syntax Element for Enabling the Disclosed Methods or Controlling the Maximum Transform Size An aspect of the present invention introduces one or more additional syntax elements in a High-Level Syntax (HLS) set such as Sequence Parameter Set (SPS), Picture Parameter Set (PPS), and slice header in the video bitstream to control the use of one or more of the disclosed methods. The one or more syntax elements may be used to indicate whether to enable or disable a particular disclosed method that supports to code large size CUs containing transform blocks of widths, heights, or areas greater than the maximum transform size without further splitting. In another embodiment, one or more HLS syntax elements may signal information for deriving a maximum transform size, which may be one or both of a maximum TB size and a maximum TU size. The information for deriving the maximum transform size may be respectively signaled for width and height. The information for deriving the maximum transform size may be respectively signaled for luma transform blocks and chroma transform blocks when different CU partitioning structures can be selected for luma and chroma components. The maximum TU size may be derived from the maximum TB sizes of associated luma and chroma TBs. The information for deriving the maximum transform size may be respectively signaled for I slices, and B and P slices, in the SPS or PPS, such that different CU partitioning structures can be selected for different slice types. The information for deriving the maximum transform size may be signaled in a slice header to allow the CU partitioning structures to be adaptively adjusted from slice to slice.

Some Specific Examples for Skipping Certain Syntax Elements Embodiments of a video encoder or decoder encode or decode video data by first partitioning each video picture into non-overlapping CTUs, then splitting each individual CTU into one or more non-overlapping CUs using a QT structure, QTBT structure, MTT structure, or other recursive partitioning structures. Each CU is not only employed as a basic unit for prediction processing but also for transform processing, in other words, each CU contains exactly one TU. A syntax element cu_skip_flag is signaled for each CU in B and P slices to indicate whether a current CU is coded in Skip mode, where cu_skip_flag equals to 1 denotes the current CU is coded in Skip mode. When a current CU is not coded in Skip mode as cu_skip_flag is equal to 0, a syntax element pred mode_flag is signaled to indicate whether the current CU is coded in inter prediction or intra prediction, and when the current CU is coded in inter prediction, a syntax element merge_flag is further signaled to indicate whether the current CU is coded in merge mode, which has associated inter prediction parameters inferred from an indicated neighboring inter-predicted partition. In a first embodiment of the zero residual method, prediction residual of each large size CU is set to zero, a video encoder skips signaling a cbf of each transform block in a current CU when a size of the current CU is greater than a maximum size threshold value, and a video decoder infers the associated cbf of each transform block in the current CU to be equal to zero when the size of the current CU is greater than the maximum size threshold value. In a second embodiment of the zero residual method, a video encoder skips signaling an associated syntax element rqt_root_cbf or cu_cbf of a current CU when a size of the current CU is greater than the maximum size threshold value, and a video decoder infers the associated rqt_root_cbf or cu_cbf of the current CU to be zero when the size of the current CU is greater than the maximum size threshold value. A video encoder of a third embodiment of the zero residual method skips signaling a CU prediction mode flag (i.e. pred_mode_flag) in B and P slices when a size of a current CU is greater than a maximum size threshold value. A video decoder of the third embodiment infers the CU prediction mode to be inter prediction when the size of the current CU is greater than the maximum size threshold value. In a fourth embodiment of the zero residual method, a video encoder skips signaling a merge flag (i.e. merge_flag) when a size of a current CU is greater than a maximum size threshold value, and a corresponding video decoder infers the merge flag to be 0 indicating the current CU is not coded in Merge mode when the size of the current CU is greater than the maximum size threshold value. In the third and fourth embodiments, the zero residual method is only applied to inter predicted CUs, and more specifically, large size CUs in the third embodiments may only be coded by Skip mode or AMVP mode with zero residual. In one preferred embodiment of the zero residual method, the video encoder skips signaling all cbfs, rqt_root_cbf or cu_cbf, pred_mode_flag, and merge_flag for each of the large size CUs and the video decoder infers cbfs and rqt_root_cbf or cu_cbf as zero, infers prediction mode as inter prediction, and infers merge flag as not coded in Merge mode. In an embodiment of the Skip mode method, a video encoder skips signaling a CU skip_flag (i.e. cu_skip_flag) when a size of a current CU is greater than a maximum size threshold value, and a video decoder infers the CU skip flag to be equal to 1 indicating the current CU is coded in Skip mode when the size of the current CU is greater than the maximum size threshold value. The above embodiments may be implemented individually or in conjunction with others. In the above embodiments, the maximum size threshold value may be simply the maximum transform size, and the maximum size threshold value may be explicitly signaled in the video bitstream or implicitly inferred.

Consider TB Size for Individual Color Components In another embodiment, a video encoder and decoder decide to split large size CUs depending on sizes of associated transform blocks of corresponding color components. Instead of comparing the size of the CU with the maximum size threshold value in the previously described embodiments, the size of each individual TB is compared with the maximum size threshold value. The maximum size threshold value may be set to equal to or derived from the maximum transform size specified by a particular coding standard. In this embodiment, luma samples and chroma samples are coded into separate CTUs where CU partitioning structures of the luma CTU and chroma CTU are controlled independently and a coding tree representation indicating the CU partitioning structure is signaled for each CTU. One example is the CU/TU structure in I slices adopted by the JEM, which allows signaling different coding tree representations for each luma CTU and its corresponding chroma CTU. An exemplary video encoder or decoder employs a CU as a basic representative unit for transform processing so each CU contains exactly one TU, and the video encoder or decoder splits CTUs into multiple CUs using QT structure, QTBT structure, MTT structure, or other recursive partitioning structure. Pixel samples from a luma component and two chroma components are represented by separate CUs. A luma CU contains one luma TB, whereas a chroma CU contains two chroma TBs. The size of a luma TB may be different from the size of an associated chroma TB, so the size of the chroma TB may not exceed a maximum size threshold value when the size of the luma TB is greater than the maximum size threshold value. For example, a 64×64 luma TB exceeds the HEVC maximum transform size (i.e. 32×32), but each of the associated 32×32 chroma TBs according to the 4:2:0 color format is within the HEVC maximum transform size. The video encoder forces to split a current CU into smaller size CUs when a width, height, or area of the associated transform block inside the current CU is greater than the maximum size threshold value. The forced split decision may be implicitly derived by the video decoder or explicitly signaled to the video decoder. For example, the video decoder splits the current CU by inferring the forced split decision according to the associated transform block size or the video decoder splits the current CU according to a split flag.

In one specific example, video pictures in 4:2:0 color format are encoded using the CTU size of 256×256 in units of luma samples, and a specified maximum transform size is equal to 128 samples in both width and height. When a video encoder or decoder processes a luma CTU with a size 256×256, since the corresponding transform block size 256×256 is greater than the maximum transform size, the video encoder or decoder forces to split each luma CTU into four quarter-size luma CUs. The four quarter-size luma CUs may be further split into even smaller size CUs depending on encoder algorithm such as rate-distortion optimization, and the final CU partitioning structure may be signaled to the decoder. The maximum size of each associated TB of the corresponding chroma CTU is 128×128 because the 4:2:0 format applies 2:1 down sampling on chroma components. The video encoder or decoder will not force to split chroma CTUs because each associated chroma TB does not exceed the maximum transform size. The encoder has the flexibility to decide whether to encode each chroma CTU using a single CU or further partition into smaller size CUs. In this example, only luma CTUs are forced to split as chroma CTUs may be coded as one single CU. In contrast, the conventional encoder and decoder always split both luma CTUs and associated chroma CTUs of size 256×256 in units of luma samples given the specified maximum transform unit size equal to 128×28 samples in the I slices.

Figure 9:
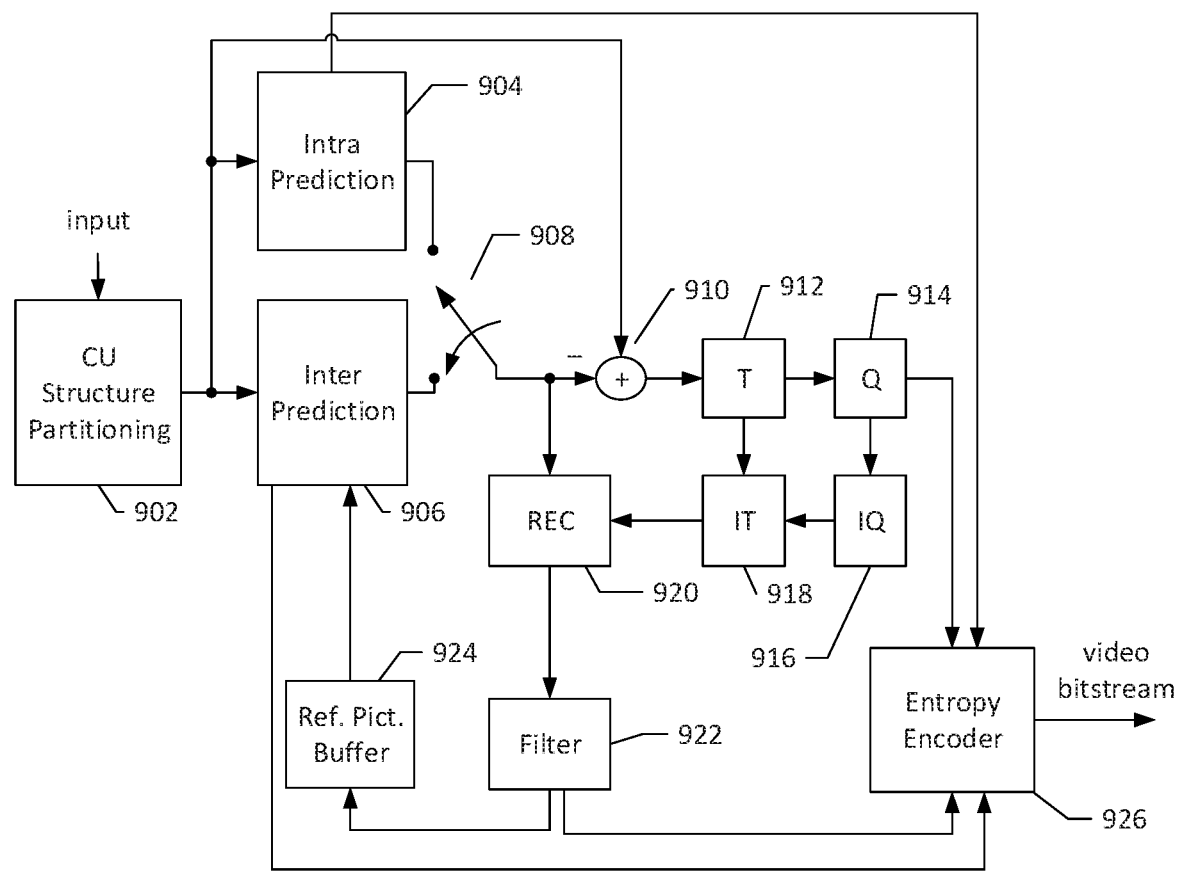
FIG. 9 illustrates an exemplary system block diagram for a video encoding system incorporating the video processing method according to embodiments of the present invention.

Exemplary System Block Diagram FIG. 9 illustrates an exemplary system block diagram for a Video Encoder 900 implementing various embodiments of the present invention. A CU Structure Partitioning module 902 receives input data of video slices and determines a block partitioning structure for each slice to be encoded. A slice is first divided into non-overlapped blocks and each block is further divided by a recursive partitioning structure into leaf blocks in the CU Structure Partitioning module 902, for example, multiple CTUs in a slice are divided into CUs according to a QTBT splitting structure or MTT splitting structure. Each CU in a current slice is predicted by Intra prediction in Intra Prediction module 904 or Inter prediction in Inter Prediction module 906 to remove spatial redundancy or temporal redundancy. Intra Prediction module 904 provides intra predictors for the current CU based on reconstructed video data in the same picture. Inter Prediction module 906 performs motion estimation (ME) and motion compensation (MC) to provide predictors for the current CU based on video data from other picture or pictures. A Switch 908 selects either Intra Prediction module 904 or Inter Prediction module 906 to supply the predictor to Adder 910 to form prediction errors, also called residual. The residual of the current CU is further processed by Transform module (T) 912 followed by Quantization module (Q) 914. The transformed and quantized residual is then encoded by Entropy Encoder 926 to form a video bitstream. The video bitstream is then packed with side information. The transformed and quantized residual of the current CU is processed by Inverse Quantization module (IQ) 916 and Inverse Transform module (IT) 918 to recover the prediction residual. As shown in FIG. 9, the residual are recovered by adding back to the selected predictor at Reconstruction module (REC) 920 to produce reconstructed video data. The reconstructed video data may be stored in Reference Picture Buffer (Ref. Pict. Buffer) 924 and used by Inter Prediction module 906 for prediction of other pictures. The reconstructed video data from REC 920 may be subject to various impairments due to the encoding processing, consequently, at least one In-loop Processing Filter (Filter) 922 is applied to the reconstructed video data before storing in the Reference Picture Buffer 924 to further enhance picture quality. Some examples of the In-loop Processing Filter are deblocking filter and Sample Adaptive Offset (SAO). According to embodiments of the present invention, if a size of a current CU in the current slice is greater than a maximum size threshold value, Video Encoder 900 sets the residual of the current CU to equal to zero, which speeds up the Video Encoder 900 as Transform module 912 and Quantization module 914, as well as Inverse Quantization module 916 and Inverse Transform module 918 may skip processing all large size CUs. In some embodiments, Video Encoder 900 skips signaling one or more syntax elements when the current CU is greater than the maximum size threshold value, for example, the CU skip flag.

Figure 10:
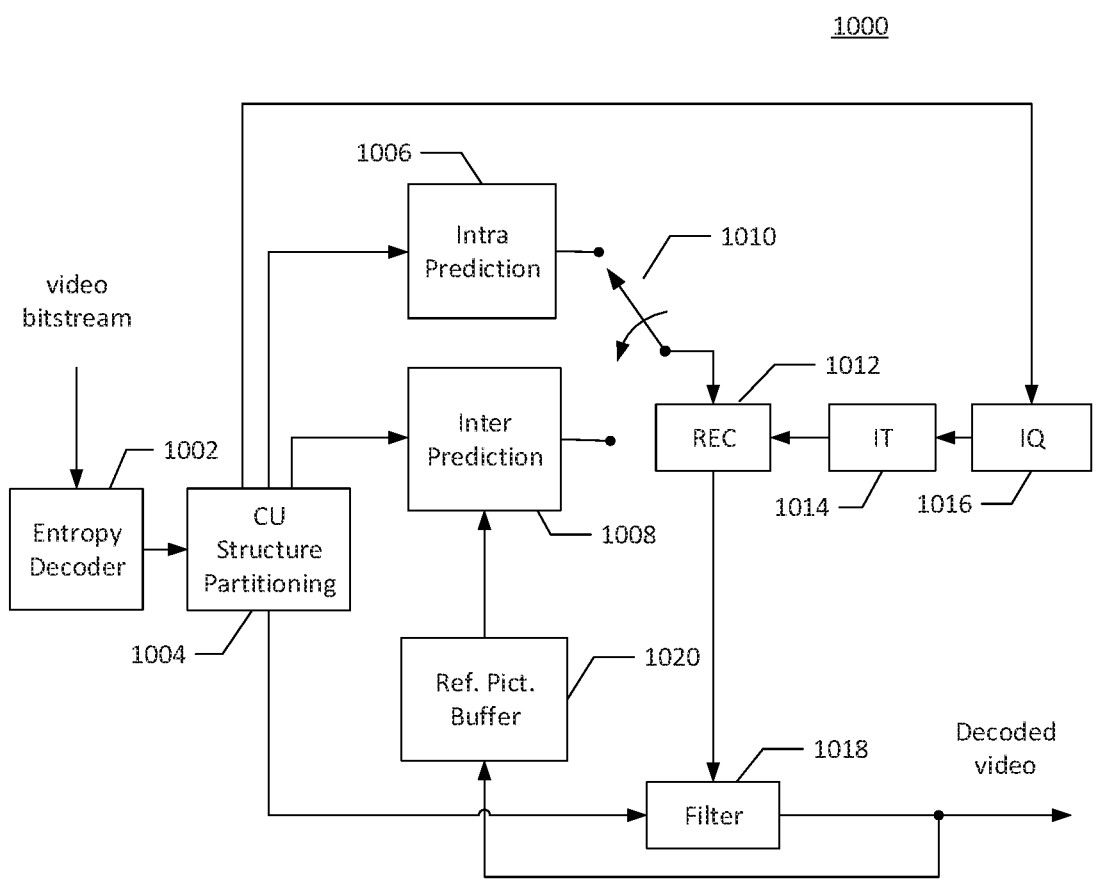
FIG. 10 illustrates an exemplary system block diagram for a video decoding system incorporating the video processing method according to embodiments of the present invention.

A corresponding Video Decoder 1000 for decoding the video bitstream generated by the Video Encoder 900 of FIG. 9 is shown in FIG. 10. The input to the Video Decoder 1000 is encoded video data associated with CUs in a current slice, and each CU is decoded by Entropy Decoder 1002 to parse prediction information, transformed and quantized residual signal, and other system information. A CU Structure Partitioning module 1004 determines CU partitioning of each video slice. The decoding process of the Decoder 1000 is similar to the reconstruction loop at the Encoder 900, except the Decoder 1000 only requires motion compensation prediction in Inter Prediction module 1008. Each CU is predicted by either Intra Prediction module 1006 or Inter Prediction module 1008, and a switch 1010 selects an intra predictor or Inter predictor according to decoded mode information. The transformed and quantized residual associated with each CU is recovered by Inverse Quantization (IQ) module 1016 and Inverse Transform (IT) module 1014. The recovered residual is reconstructed by adding back the predictor in REC 1012 to produce reconstructed video. The reconstructed video is further processed by In-loop Processing Filter (Filter) 1018 to generate final decoded video. If the currently decoded picture is a reference picture, the reconstructed video of the currently decoded picture is also stored in Ref. Pict. Buffer 1020 for later pictures in decoding order.

In some embodiments, no modification is applied to Video Decoder 1000 when the zero residual method is only implemented in Video Encoder 900. In some other embodiments, Video Decoder 1000 infers the residual of a current CU to be zero or infers the current CU is coded in Skip mode when the current CU is greater than a maximum size threshold value. For example, Video Decoder 1000 infers the cu_skip_flag for a large size CU to be one according to the Skip mode method, or Video Decoder 1000 infers cbfs of all TBs in a large size CU to be zero according to the zero residual method.

Various components of the Video Encoder 900 and Video Decoder 1000 in FIG. 9 and FIG. 10 may be implemented by hardware components, one or more processors configured to execute program instructions stored in a memory, or a combination of hardware and processor. For example, a processor executes program instructions to control receiving of input data associated with a current slice. The processor is equipped with a single or multiple processing cores. In some examples, the processor executes program instructions to perform functions in some components in the Encoder 900 and Decoder 1000, and the memory electrically coupled with the processor is used to store the program instructions, information corresponding to the reconstructed images of CUs, and/or intermediate data during the encoding or decoding process. The memory in some embodiments includes a non-transitory computer readable medium, such as a semiconductor or solid-state memory, a random access memory (RAM), a read-only memory (ROM), a hard disk, an optical disk, or other suitable storage medium. The memory may also be a combination of two or more of the non-transitory computer readable mediums listed above. As shown in FIGS. 9 and 10, the Encoder 900 and Decoder 1000 may be implemented in the same electronic device, so various functional components of the Encoder 900 and Decoder 1000 may be shared or reused if implemented in the same electronic device.

Embodiments of the video data processing methods capable of processing large size CUs may be implemented in a circuit integrated into a video compression chip or program code integrated into video compression software to perform the processing described above. For examples, determining of a current mode set for the current block may be realized in program code to be executed on a computer processor, a Digital Signal Processor (DSP), a microprocessor, or field programmable gate array (FPGA). These processors can be configured to perform particular tasks according to the invention, by executing machine-readable software code or firmware code that defines the particular methods embodied by the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A video processing method in a video coding system, comprising:

receiving input video data associated with a current Coding Unit (CU) in a current slice or receiving encoded video data associated with the current CU in the current slice from a video bitstream, wherein the current slice is partitioned into multiple non-overlapped CUs and each CU contains only one Transform Unit (TU);

determining whether a size of the current CU is greater than a maximum size threshold value;

setting residual of the current CU to zero when the size of the current CU is greater than the maximum size threshold value; and encoding the current CU or decoding the current CU, wherein the current CU is not further split into smaller blocks for prediction and transform processing.

2. The method of claim 1, wherein the size of the current CU and the maximum size threshold value are measured in one-dimensional or in two-dimensional, and the size of the current CU is a width or height of the current CU when the size is measured in one-dimensional.

3. The method of claim 1, wherein a current TU in the current CU is consisting of a luminance (luma) Transform Block (TB) and two chrominance (chroma) TBs, and setting residual of the current CU to zero comprises setting all coefficient level values inside the luma and the two chroma TBs to zero when the current CU is greater than the maximum size threshold value.

4. The method of claim 1, wherein encoding the current CU further comprises skipping signaling information related to associated residual of the current CU when the size of the current CU is greater than the maximum size threshold value, and wherein decoding the current CU further comprises inferring the associated residual of the current CU to be equal to zero when the size of the current CU is greater than the maximum size threshold value.

5. The method of claim 1, wherein the maximum size threshold value is explicitly signaled in a high-level syntax set of the video bitstream or implicitly derived.

6. The method of claim 1, wherein the maximum size threshold value is set or derived from a maximum transform size, and the maximum transform size is a maximum transform unit size or a maximum transform block size.

7. The method of claim 1, wherein setting residual of the current CU to zero further comprises selecting Skip mode to encode or decode the current CU when the size of the current CU is greater than the maximum size threshold value.

8. The method of claim 7, wherein encoding the current CU further comprises skipping signaling a skip flag when the size of the current CU is greater than the maximum size threshold value, and wherein decoding the current CU further comprises inferring the skip flag as one indicating the current CU is coded in Skip mode when the size of the current CU is greater than the maximum size threshold value.

9. The method of claim 1, wherein encoding the current CU further comprises skipping signaling a coded block flag (cbf) of a Transform Blocks (TB) in the current CU when the size of the current CU is greater than the maximum size threshold value, and wherein decoding the current CU further comprises inferring the cbf of the TB to be equal to zero when the size of the current CU is greater than the maximum size threshold value.

10. The method of claim 1, wherein encoding the current CU further comprises skipping signaling a coding unit coded block flag (cu_cbf) of the current CU when the size of the current CU is greater than the maximum size threshold value, and wherein decoding the current CU further comprises inferring the cu_cbf to be zero when the size of the current CU is greater than the maximum size threshold value.

11. The method of claim 1, wherein encoding the current CU further comprises skipping signaling a CU prediction mode flag when the size of the current CU is greater than the maximum size threshold value, and wherein decoding the current CU further comprises inferring the CU prediction mode for the current CU to be inter prediction when the size of the current CU is greater than the maximum size threshold value.

12. The method of claim 1, wherein encoding the current CU further comprises skipping signaling a merge flag when the size of the current CU is greater than the maximum size threshold value, and wherein decoding the current CU further comprises inferring the merge flag to be zero indicating the current CU is not coded in Merge mode when the size of the current CU is greater than the maximum size threshold value.

13. The method of claim 1, further comprising determining whether the size of the current CU is smaller than a minimum size threshold value, and setting residual of the current CU to zero when the size of the current CU is smaller than the minimum size threshold value.

14. The method of claim 13, wherein the minimum size threshold value is explicitly signaled in a high-level syntax set of the video bitstream or implicitly derived.

15. The method of claim 1, wherein the current slice is a Bi-predictive (B) slice or a Predictive (P) slice, and sizes of all CUs in Intra (I) slices are restricted to be less than or equal to the maximum size threshold value.

16. The method of claim 1, wherein the current CU is coded in an inter prediction mode, and sizes of all intra coded CUs are restricted to be less than or equal to the maximum size threshold value.

17. The method of claim 1, further comprising determining a syntax element signaled in the video bitstream to indicate whether large size CUs are allowed, wherein the large size CUs are CUs with a size greater than the maximum size threshold value, and if the syntax element indicates large size CUs are not allowed, forcing to split the current CU into smaller CUs when the size of the current CU is greater than the maximum size threshold value.

18. The method of claim 1, wherein setting residual of the current CU to zero comprises setting a coded block flag (cbf) of one or more Transform Blocks (TBs) in the current CU to zero when the size of the current CU is greater than the maximum size threshold value.

19. An apparatus for processing video data in a video coding system, the apparatus comprising one or more electronic circuits configured to:
receive input video data associated with a current Coding Unit (CU) in a current slice or receiving encoded video data associated with the current CU in the current slice from a video bitstream, wherein the current slice is partitioned into multiple non-overlapped CUs and each CU contains only one Transform Unit (TU);
determine whether a size of the current CU is greater than a maximum size threshold value;
set residual of the current CU to zero when the size of the current CU is greater than the maximum size threshold value; and
encode the current CU or decoding the current CU, wherein the current CU is not further split into smaller blocks for both prediction and transform processing.

20. A non-transitory computer readable medium storing program instructions causing a processing circuit of an apparatus to perform a video processing method, and the method comprising:
receiving input video data associated with a current Coding Unit (CU) in a current slice or receiving encoded video data associated with the current CU in the current slice from a video bitstream, wherein the current slice is partitioned into multiple non-overlapped CUs and each CU contains only one Transform Unit (TU);
determining whether a size of the current CU is greater than a maximum size threshold value;
setting residual of the current CU to zero when the size of the current CU is greater than the maximum size threshold value; and
encoding the current CU or decoding the current CU, wherein the current CU is not further split into smaller blocks for both prediction and transform processing.

* * * * *